United States Patent [19]

Cook

[11] 4,265,510
[45] May 5, 1981

[54] THREE MIRROR ANASTIGMATIC OPTICAL SYSTEM

[75] Inventor: Lacy G. Cook, Hawthorne, Calif.

[73] Assignee: Hughes Aircraft Company, Culver City, Calif.

[21] Appl. No.: 39,530

[22] Filed: May 16, 1979

[51] Int. Cl.³ .......................................... G02B 17/00
[52] U.S. Cl. ..................................................... 350/55
[58] Field of Search ................................... 350/55, 274

[56] References Cited

U.S. PATENT DOCUMENTS

| 3,674,334 | 7/1972 | Offner | 350/294 X |
| 4,101,195 | 7/1978 | Korsch | 350/55 |

FOREIGN PATENT DOCUMENTS 1393577  2/1965 France .

OTHER PUBLICATIONS

Gelles, "Unobscured Aperture Stigmatic Telescopes", Optical Engineering, vol. 13, pp. 534–538, Nov./Dec. 1974.
Applied Optics, vol. 17, nr 17, Sep. 1, 1978, P. N. Robb: "Three-Mirror Telescopes: Design and Optimization", pp. 2677–2685.
Optical Engineering, vol. 14, nr 6, Nov.–Dec. 1975, D. Korsch: "A Three-Mirror Space Telescope", pp. 533–535.

Primary Examiner—John K. Corbin
Assistant Examiner—Matthew W. Koren
Attorney, Agent, or Firm—Allen A. Dicke, Jr.; W. H. MacAllister

[57] ABSTRACT

Primary mirror 12, secondary mirror 14 and tertiary mirror 16 form an anastigmatic relayed image forming optical system which is off-axis and decentered in both aperture and field angle. The secondary and tertiary mirrors are tilted and decenter relative to the optical axis of the primary mirror to enhance image quality. Additional advantages include compact packaging, easy accessibility to all components, and improved shielding of unwanted out-of-field radiation.

18 Claims, 4 Drawing Figures

THREE MIRROR ANASTIGMATIC OPTICAL SYSTEM

The Government has rights in this invention pursuant to Contract No. DASG 60-78-C-0035 awarded by the Department of Defense.

BACKGROUND

This invention is directed to a family of relayed image-forming optical systems consisting of three conic mirrors. The mirrors are configured so that the system is used off-axis in both aperture and field angle.

The prior art includes Korsch U.S. Pat. No. 4,101,195 which discloses an anastigmat three mirror telescope wherein the primary and tertiary mirrors are ellipsoidal and the secondary mirror is hyperboloid. A fold mirror is positioned at an angle of 45° with respect to the image formed by the primary-secondary mirrors. Offner U.S. Pat. No. 3,674,334 discloses a catoptric anastigmat afocal optical system where the primary and tertiary mirrors are parabolic and the secondary mirror is hyperboloic, see FIG. 3. Additionally, Meinel et al U.S. Pat. No. 4,131,485 discloses in FIG. 2 a solar energy collector and concentrator system having primary and tertiary reflectors, and a secondary of hyperboidal shape.

Additional, more general prior art is represent by the following publications:

(1) *Conic Mirrors* by H. P. Brueggemann (1968, Focal Press).
(2) *Space Optics,* Proceedings of the 9th International Congress of the International Commission for Optics, National Academy of Sciences, 1974.
(3) *Handbook of Military Infrared Technology,* Office of Naval Research, 1965.

SUMMARY

In order to aid in the understanding of this invention it can be stated essentially in summary form that it is directed to a family of relayed image-forming optical systems consisting of three conic mirrors. The mirrors are arranged so that the system operates off-axis in both aperture and field angle.

It is thus an object of this invention to provide a three mirror anastigmatic optical system employing conic mirrors wherein the system is off-axis in both aperture and field angle. It is another object to provide a family of relayed image forming optical systems which is well suited for relatively fast systems speeds, from the range of about F/2.5 to about F/5.0 and covering a large line field of view having good image quality over a 10° by 0.5° field of view, but also applicable for fields of lower aspect ratio, such as a field of view of 6°×3°. It is a further object of this invention to provide an optical system which is compact and can fit without auxiliary fold mirrors in a box-like structure the sides of which are equal in length to one half of the system's focal length, to offer excellent packaging, shielding and performance capability. It is a further object of this invention to provide an optical system which is well shielded from unwanted out-of-field radiation, both by employing a relay mirror and aperture and field stops.

Other objects and advantages of this invention will become apparent from the study of the following portion of this specification, the claims and the attached drawings.

DESCRIPTION OF THE PREFERRED EMBODIMENTS

Figure 1:
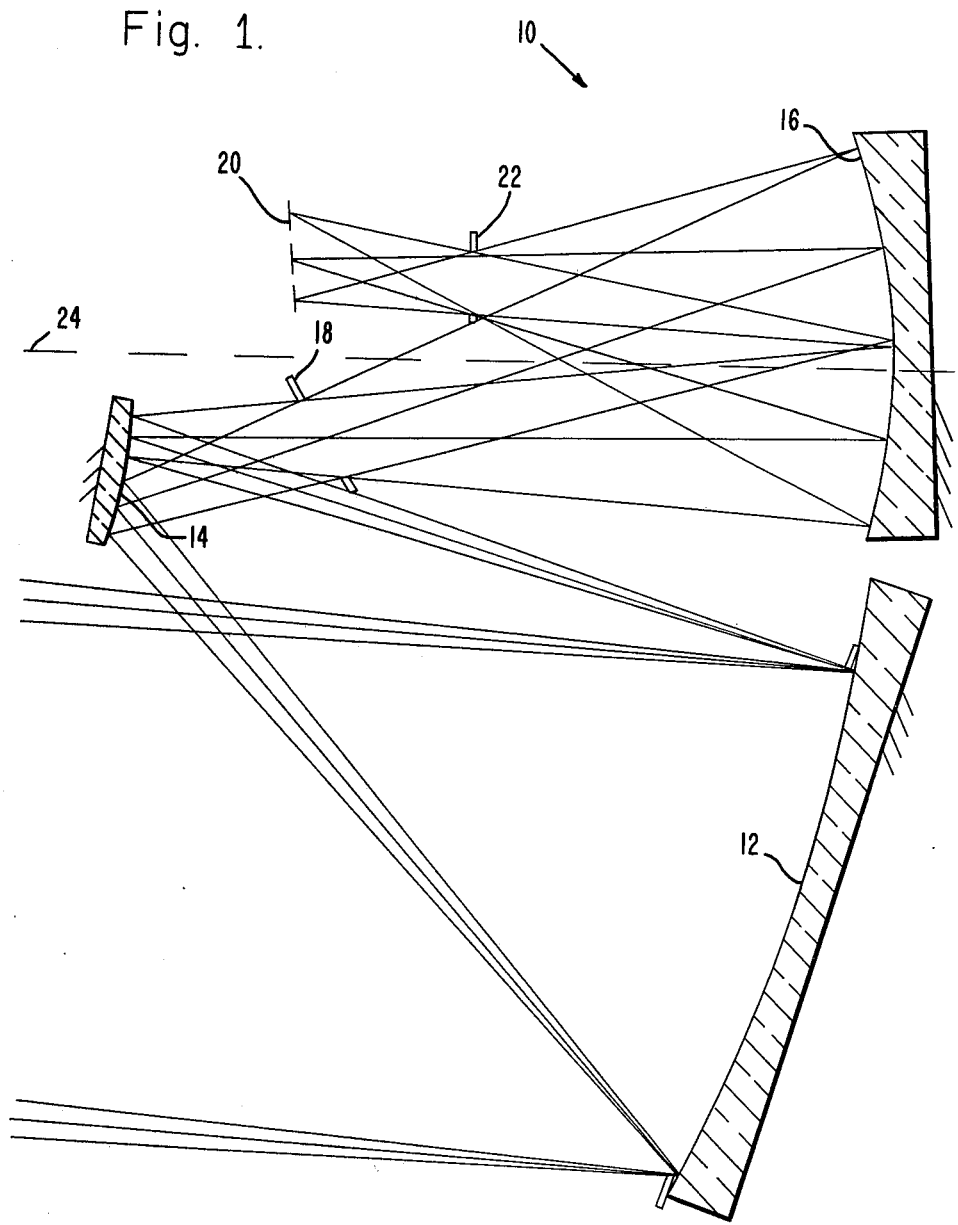
FIG. 1 is a side elevational schematic of the first preferred embodiment of the three mirror anastigmatic optical system of this invention.
Figure 2:
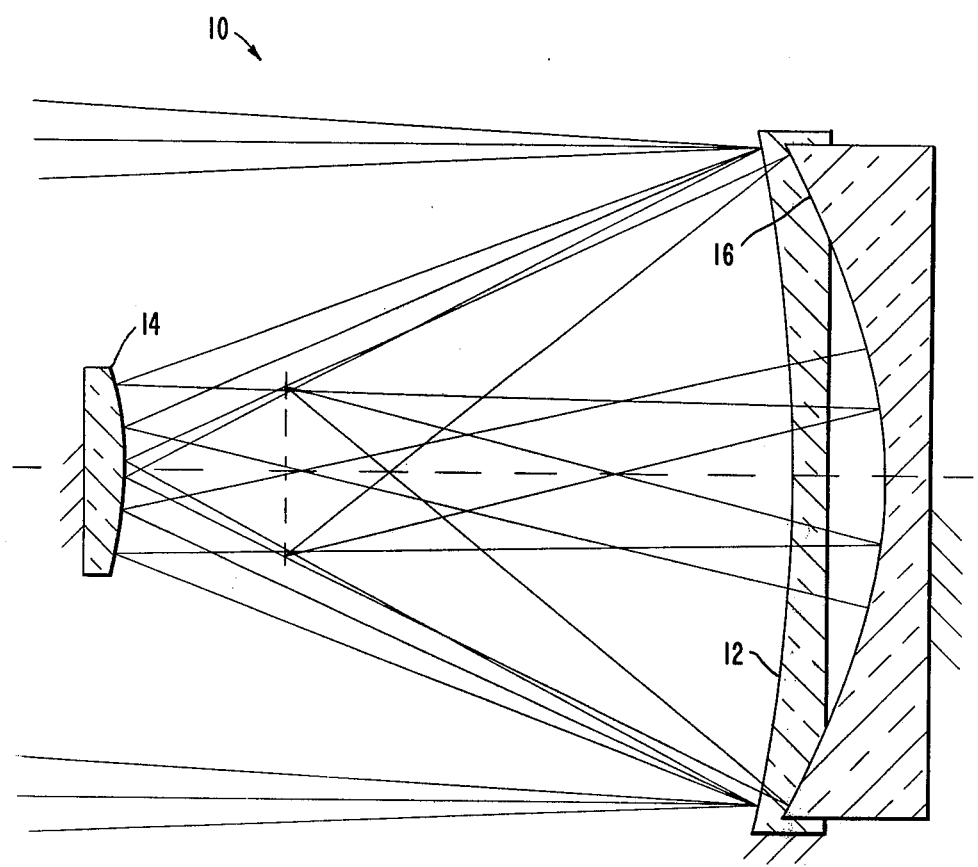
FIG. 2 is a plan view thereof.

The first preferred embodiment of the three mirror anastigmatic optical system of this invention is generally indicated at 10 in FIGS. 1 and 2.

This system is a relayed, image-forming optical system consisting of three conic mirrors. Primary mirror 12 is an ellipsoid. Secondary mirror 14 is a hyperboloid. Tertiary mirror 16 is a another ellipsoid. Primary mirror 12 and secondary mirror 14 constitute a telephoto objective forming an intermediate image at which is placed field stop 18, see FIG. 1. This intermediate image is relayed to the final image surface 20 by the tertiary mirror 16.

The entrance pupil is on the surface of primary mirror 12. Secondary mirror 14 and tertiary mirror 16 also form an optical system that images the entrance pupil on the surface of the primary mirror to the aperture stop 22 positioned between tertiary mirror 16 and final image surface 20. This pupil imagery allows the system to be shielded from unwanted out-of-field radiation.

The system is used off axis in both aperture and field. Neither the entrance pupil on the surface of primary mirror 12 nor the aperture stop 22 is centered on the optical axis 24. The field of view extends from 2.15° to 5.05° in a vertical direction and from +3 to −3° in the horizontal direction in the first preferred embodiment. The unique geometry of the optical system lends itself to such fields of view, but the system will also work well for a 0.5°×10° format.

FIGS. 1 and 2 show system 10 in vertical and horizontal sections, respectively. The following lists the optical characteristics; the design has been scaled to unit focal length. The offset elliptically shaped entrance pupil is at the primary mirror. The primary and secondary mirrors form a Cassegrainian pair with an image in the space between them. The intermediate image is relayed by the tertiary mirror to the final image plane at unit magnification. The entrance pupil is reimaged in the space between this mirror and the final image. The narrow dimensions of both the entrance pupil and the field of view are shown in FIG. 1; such an arrangement is needed to facilitate packaging and to provide clearances in that plane. Using the form with an offset field angle allows the intermediate and the final images to be separated and makes them accessible. The use of the form off-axis in aperture yields an unobscured system and reduces the angles of incidence at the final image in the plane in FIG. 1.

A specific prescription for the system 10 is given in the following table.

TABLE

Prescription of a specific embodiment of system 10

| # | DESCRIPTION | RADIUS | CC | THICKNESS | TILT | DECENTER |
|---|---|---|---|---|---|---|
| 12 | Primary Mirror | −1.1013 | −.79412 | −.48928 | — | — |
| 14 | Secondary Mirror | −.29811 | −3.4532 | .49014 | 3.4906° | .00938 |
| 16 | Tertiary Mirror | −.38517 | −.19789 | −.38415 | 4.2488° | .03136 |
| 20 | Focal Plane | ∞ | — | — | 4.8733° | .00427 |
| | Focal Length | | 1.0 | | | |
| | Entrance Aperture | .328 × .428, Elliptical Displaced Down .361 | | | | |
| | F/Number | 2.6 | | | | |
| | Field of View | 2.9° Horizontal × 6.0° Vertical Rectangular Displaced up by 3.6° | | | | |

Figure 3:
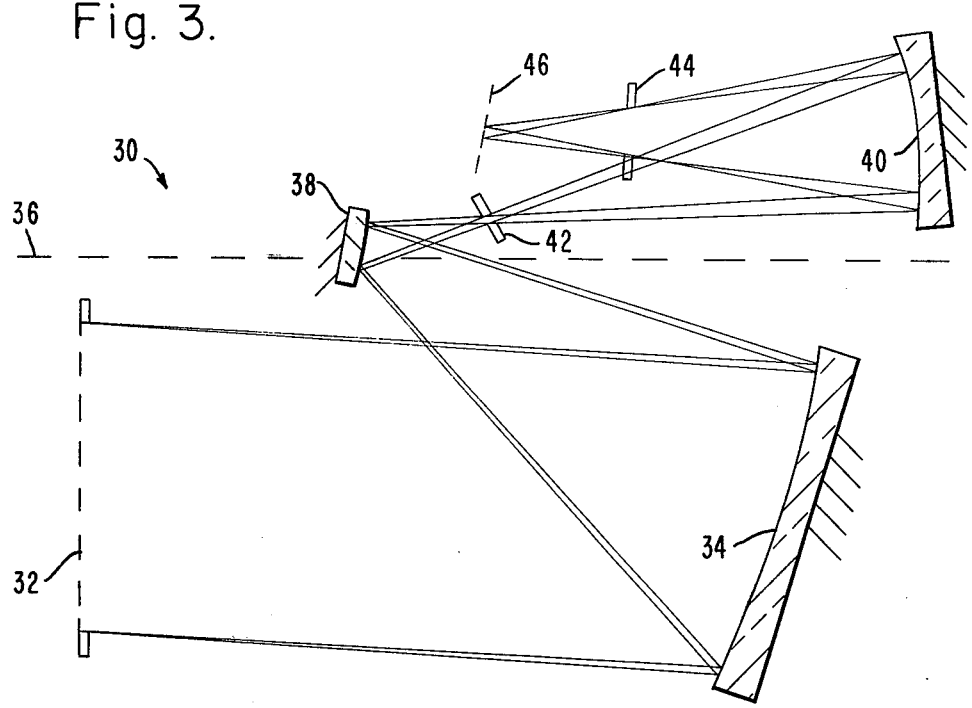
FIG. 3 is a schematic side elevational view of a second preferred embodiment of the three mirror anastigmatic optical system of this invention.
Figure 4:
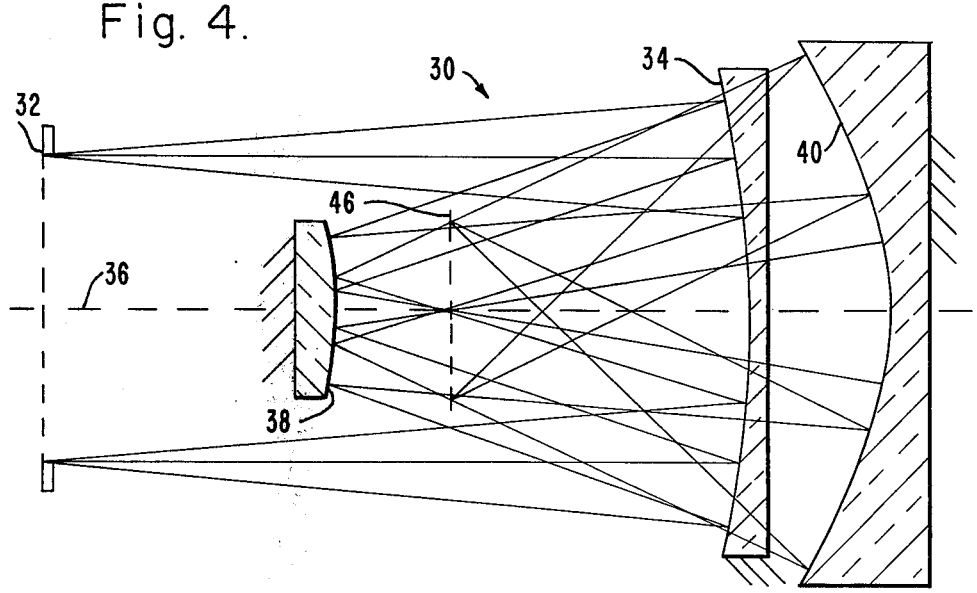
FIG. 4 is a plan view thereof.

(+) Distances are to the right
(+) Radii have centers to the right
(+) Decenters are up
(+) Tilts are counter clockwise
CC conic constant = − (eccentricity)$^2$
Decenters are done before tilting The second preferred embodiment of the three mirror anastigmatic optical system is generally indicated at 30 in FIGS. 3 and 4. In the system 30 the entrance pupil 32 is out in front of ellipsoid primary mirror 34 which determines the optical axis 36 which defines the system center line. Secondary mirror 38 is a hyperboloid and tertiary mirror 40 is a ellipsoid. Field stop 42 is positioned between secondary mirror 38 and tertiary mirror 40 while aperture stop 44 is positioned between tertiary mirror 40 and image plane 46. As can especially be seen in FIG. 3, this system is configured to be off-axis in both aperture and field. Neither the entrance pupil 32, the field stop 42 or aperture stop 44 is on axis 36. The system is particularly useful in rectangular format for narrow line imagery.

FIGS. 3 and 4 are the vertical and horizontal sections, respectively, of system 30. This design differs from system 10 in the location of the entrance pupil, the optical speed, and the field of view. The circular entrance pupil is well in front of the primary mirror, the optical speed is f/3.0, and the field of view is essentially a 10° line in the plane in FIG. 4. As in system 10, the aperture stop (of which the entrance pupil is an image) is the surface immediately preceding the final image plane. This location is ideal for efficient cold shielding and the rejection of out-of-field radiation, but it necessarily results in high angles of incidence in the horizontal plane at the final image. The 10° field of view in system 30 is approaching an upper limit, as the chief ray angles of incidence approach 35°. It is also apparent from FIG. 4 that the size of the tertiary mirror depends very much on the field of view.

A prescription for a specific embodiment of the system 30 is given below.

| # | DESCRIPTION | RADIUS | CC | THICKNESS | TILT | DECENTER |
|---|---|---|---|---|---|---|
| 32 | Entrance pupil | ∞ | — | .80190 | — | — |
| 34 | Primary mirror | −1.1258 | −.7762 | −.49222 | — | — |
| 38 | Secondary mirror | −.33574 | −3.4876 | .58603 | 2.2521° | .00697 |
| 40 | Tertiary mirror | −.46402 | −.18303 | .46703 | 2.0983° | .01937 |
| 46 | Focal plane | ∞ | — | — | — | — |
| | Focal length | 1.0 | | | | |
| | Entrance aperture | | .324 | dia. circular, displaced down .−316 | | |
| | F/number | 3.0 | | | | |
| | Field of view | .5° Vertical × 10.0° Horizontal Displaced down by 2.5° | | | | |

(+) Distances are to the right
(+) Radii have centers to the right
(+) Decenters are up
(+) Tilts are counterclockwise
CC Conic constant = − (ECCENTRICITY)$^2$
Decenters are done before tilting Advantages provided by the systems which are examples of the preferred embodiment of this invention include the simplicity in that the mirrors are conic. This provides easier fabrication than necessary for higher order or general aspheric mirrors. Thus, proper accuracy can be achieved. Furthermore, the systems each are of such nature that they can be placed in a very small package. Size and weight reduction is achieved. Each of the optical systems can fit in a box, the sides of which are equal to the length of one half the system's focal length. Prior structures were from 2 to 4 times this size. Additionally, each of the systems provides good shielding because of the relaying by the secondary mirror at by the transmitting aperture stop. Furthermore, good performance is obtained by the system, with the specific example prescription for the embodiment of system 30 providing an image quality from 50 to 100 microrad quality.

Specific utility with the three mirror anastigmat optical system of this invention includes the systems where sensors are placed at the image surface to convert the image into electronic signals. The sensors would be placed along the line of the image so that if a field-of-view is scanned by the optical system, the image seen can be sensed by a plurality of sensors positioned along the line at the image surface, so that recontruction is possible.

This invention has been described in its presently preferred embodiment and it is clear that it is susceptible to numerous modifications and embodiments within the ability of those skilled in the art. Accordingly, the scope of this invention is defined by the scope of the following claims.

I claim:

1. A three mirror anastigmatic optical system comprising:
    a primary mirror defining an optical axis, said primary mirror having a conic ellipsoid reflective surface on one side of said optical axis;
    an image surface on the other side of said optical axis;
    a secondary mirror having a conic hyperboloid reflective surface which is tilted and decentered with respect to said optical axis; and
    a tertiary mirror having a conic ellipsoid reflective surface which is tilted and decentered with respect to said optical axis, said primary, secondary and tertiary mirrors having surfaces shaped to form an image of an object at said image surface, said optical system being off-axis in aperture and field to determine said positions of said primary mirror and said image surface.

2. The optical system of claim 1 wherein a field stop is positioned between said secondary and said tertiary mirrors.

3. The optical system of claim 1 wherein an aperture stop is positioned between said tertiary mirror and the image surface.

4. The optical system of claim 3 wherein a field stop is positioned between said secondary and said tertiary mirrors.

5. The optical system of claim 4 wherein the entrance pupil for said optical system is on the surface of said primary mirror.

6. The optical system of claim 4 wherein the entrance pupil for said optical system is positioned in front of said primary mirror.

7. The optical system of claim 4 wherein the image formed at said image surface is substantially rectangular and of an aspect ratio greater than 2:1 in a plane substantially normal to said optical axis.

8. The optical system of claim 1 wherein the entrance pupil for said optical system is positioned in front of said primary mirror.

9. A three mirror anastigmatic optical system comprising:
    a primary mirror defining an optical axis, said primary mirror having a conic ellipsoid reflective surface on one side of said optical axis;
    an entrance pupil for said optical system on the surface of said primary mirror;
    a secondary mirror having a conic hyperboloid reflective surface which is tilted and decentered with respect to said optical axis;
    a tertiary mirror having a conic ellipsoid reflective surface which is tilted and decentered with respect to said optical axis, said primary, secondary and tertiary mirrors having surfaces shaped to focus an object at an image surface, said image surface being on the other side of said optical axis from said reflective surface of said primary mirror, said system being off-axis in aperture and field to produce said positions of said reflective surface of said primary mirror and said image plane.

10. The optical system of claim 9 wherein said optical system has a speed range of about f/2.5 to f/5.0.

11. The optical system of claim 9 wherein said system has a rectangular field of view over a range of about 10° by 0.5° to about 6° by 3°.

12. The optical system of claim 11 wherein said optical system has a speed range of about f/2.5 to f/5.0.

13. The optical system of claim 9 wherein said system can fit without auxiliary fold mirrors into a box-like structure the sides of which are equal in length to about ½ of the focal length of the system.

14. The optical system of claim 9 further including an aperture stop positioned between said tertiary mirror and said final image surface at the image plane of said entrance pupil.

15. The optical system of claim 9 wherein a field stop is positioned between said secondary mirror and said tertiary mirror at an intermediate image plane.

16. The optical system of claim 15 further including an aperture stop positioned between said tertiary mirror and said final image surface at the image plane of said entrance pupil so as to shield said system from unwanted out-of-field radiation.

17. A three mirror anastigmatic optical system comprising:
    a primary mirror defining an optical axis, said primary mirror having a conic ellipsoid reflective surface on one side of said optical axis;
    a secondary mirror having a conic hyperboloid reflective surface which is tilted and decentered with respect to said optical axis;
    a tertiary mirror having a conic ellipsoid reflective surface tilted and decentered with respect to said optical axis, said primary, secondary and tertiary mirrors having surfaces shaped to focus an object at an image surface, said image surface being positioned on the other side of said optical axis from said reflective surface of said primary mirror;
    an entrance pupil adjacent the reflective surface of said primary mirror, said secondary and tertiary mirrors imaging said entrance pupil at an aperture stop plane between said tertiary mirror reflective surface and said final image surface;
    an aperture stop positioned at said aperture stop plane;
    said reflective surface of said primary mirror and said reflective surface of said secondary mirror focusing the object at an intermediate image plane between said secondary reflective mirror surface and said tertiary reflective mirror surface, a field stop positioned at said intermediate image plane so that said entrance pupil, said field stop and said aperture stop shielding said final image surface from unwanted out-of-field radiation.

18. The optical system of claim 17 wherein said system can fit without auxiliary fold mirrors into a box-like structure the sides of which are equal in length to ½ of the system's focal length.

* * * * *